United States Patent [19]

Payne et al.

[11] Patent Number: 5,041,809

[45] Date of Patent: Aug. 20, 1991

[54] GLASS-CERAMIC TEMPERATURE SENSOR FOR HEATING OVENS

[75] Inventors: Thomas R. Payne; John Schultz, both of Louisville, Ky.

[73] Assignee: General Electric Company, Louisville, Ky.

[21] Appl. No.: 462,110

[22] Filed: Jan. 8, 1990

[51] Int. Cl.$^5$ ............................................. H01C 3/04
[52] U.S. Cl. .................................. 338/25; 219/505
[58] Field of Search ............... 338/25; 219/494, 504, 219/505, 510; 374/185, 29, 30

[56] References Cited

U.S. PATENT DOCUMENTS

| | | | |
|---|---|---|---|
| 3,006,775 | 10/1961 | Chen | 106/39 |
| 3,720,900 | 3/1973 | Von Bruning | 338/25 |
| 3,786,390 | 1/1974 | Kristen | 338/22 R |
| 4,050,052 | 9/1977 | Reichelt et al. | 338/308 |
| 4,103,275 | 7/1978 | Diehl et al. | 338/25 |
| 4,139,833 | 2/1979 | Kirsch | 338/308 |
| 4,237,368 | 12/1980 | Welch | 219/449 |
| 4,282,507 | 8/1981 | Tindall et al. | 338/25 |
| 4,332,081 | 6/1982 | Francis | 338/25 X |
| 4,375,056 | 2/1983 | Baxter et al. | 338/25 |
| 4,464,646 | 8/1984 | Burger et al. | 338/25 |
| 4,719,442 | 1/1988 | Bohara et al. | 338/25 |
| 4,722,609 | 2/1988 | Epstein et al. | 338/25 X |
| 4,791,398 | 12/1988 | Sittler et al. | 338/25 |
| 4,816,647 | 3/1989 | Payne | 219/464 |

Primary Examiner—Marvin M. Lateef
Attorney, Agent, or Firm—H. Neil Houser; Radford M. Reams

[57] ABSTRACT

A temperature sensor includes a glass-ceramic substrate and a plurality of conductive elements deposited on the substrate. The substrate serves both as a support for the conductive elements and as a temperature-sensitive resistive material forming an operative part of the sensor itself. The conductive elements are arranged to provide one sensor configuration for sensing temperature over a first temperature range as a function of the resistance of one of the elements, a second sensor configuration for sensing temperature over a second temperature range as a function of the surface resistance of the substrate between two of the elements, and a third sensor arrangement for sensing temperature over a third temperature range as a function of the bulk resistance of the substrate between two of the elements separated by a thickness of substrate material less than the surface distance therebetween. Four contact pads are provided to connect the three sensor configurations to external signal processing circuitry.

15 Claims, 4 Drawing Sheets

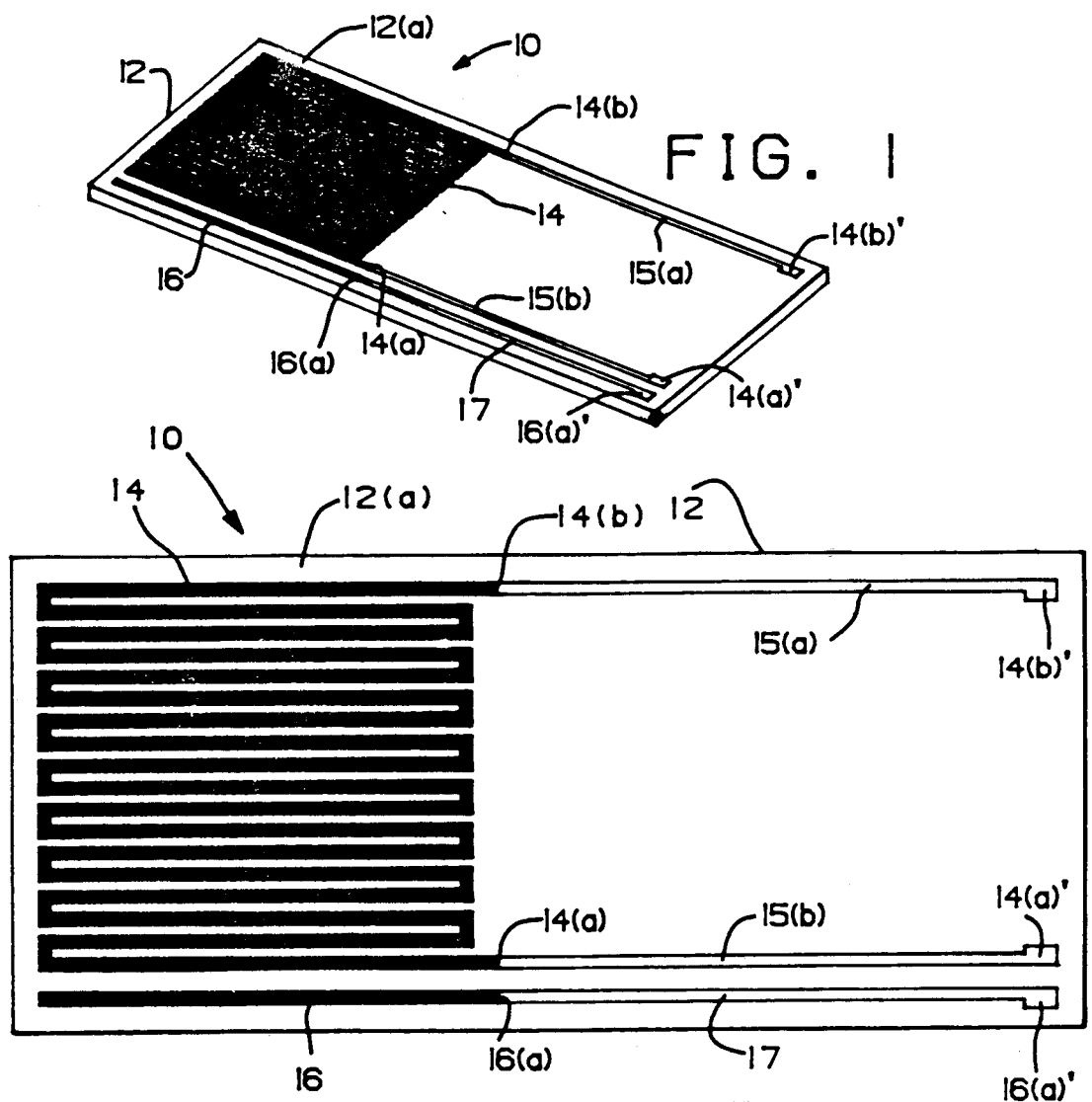

GLASS-CERAMIC TEMPERATURE SENSOR FOR HEATING OVENS

BACKGROUND OF THE INVENTION

This invention relates generally to temperature sensors of a type having application to heating ovens, and is particularly advantageously employed as a temperature sensor in domestic self-cleaning cooking ovens.

In self-cleaning domestic cooking ovens it is desirable to be able to control the oven temperature over an operating range on the order of 100° F. to 1000° F. or higher. In commercially available domestic thermal cooking ovens with electronic control systems, the temperature sensor typically comprises a sheathed length of nickel or nickel alloy wire which extends into the oven cavity along the rear interior wall. Temperature measurements are derived as a function of the resistance of the wire which changes with temperature. Such wire sensors are characterized by a relatively low temperature coefficient of resistivity. Thus, while the sensor itself is relatively inexpensive, the associated circuitry required to accurately detect relatively small changes in temperature for the range of operating temperatures over which the control system must operate is relatively costly.

Platinum resistance temperature detectors (RTD) of various types are also commercially available for measuring temperatures in the range of interest for self-cleaning oven applications. However, in addition to being relatively costly, RTD's have the same disadvantages as the nickel wire sensors, low temperature coefficient of resistivity over the temperature range of interest.

In commonly assigned U.S. Pat. No. 4,816,647 to Payne, a radiant cooktop appliance with a glass-ceramic cooktop surface includes a sensor for monitoring the temperature of the cooktop comprising a pair of parallel conductive strips deposited on the underside of the glass-ceramic surface. The surface resistance of the glass between the strips provides a measure of the temperature of the cooktop surface in that region. One disadvantage of such a sensor arrangement is its extremely high resistivity toward the lower end of the temperature range of interest for self-cleaning ovens, necessitating the use of additional circuitry to measure the temperature with sufficient accuracy over the entire operating range.

U.S. Pat. No. 3,786,390 to Kristen discloses a temperature sensor which senses temperature as a function of the bulk resistance of a glass-ceramic material between the conductive leads. However, it too is characterized by extremely high resistivity in the lower portion of the temperature range of interest.

Resistance thermometers employing a sensor structure comprising conductive film deposited on a glass substrate in a serpentine pattern to sense temperature as a function of the resistance of the conductive film itself is disclosed in U.S. Pat. No. 3,720,900. This sensor arrangement for use in precision scientific instruments to measure temperatures ranging from room temperature down to very low temperatures on the order of 10° K. In this arrangement the glass merely serves to structurally support the conductive film. While such an arrangement might work well at the very low end of the cooking temperature range, it would likely not be satisfactory in the higher temperature and in any event such precision devices are too costly for domestic appliance applications.

Therefore, a need exists for a relatively inexpensive temperature sensor for electronically controlled domestic self-cleaning cooking ovens which provides better accuracy over the entire operating range than that achievable with conventional nickel wire sensors without need for the relatively expensive signal processing circuitry.

It is therefore an object of the present invention to provide a temperature sensor comprising relatively inexpensive materials, which is easily and inexpensively assembled and which operates over the range of 100° F. to 1500° F. with resistance values sufficiently low over this range to permit improved accuracy without need for complex and costly interface circuitry to process the temperature signals derived from the sensor.

SUMMARY OF THE INVENTION

In accordance with one aspect of the present invention a temperature sensor comprises a glass-ceramic substrate and a plurality of conductive elements deposited on or in the substrate. The substrate serves both as a support for the conductive elements and as a temperature-sensitive resistive material comprising an operative part of the sensor itself. The conductive elements are arranged to provide a first sensor configuration for sensing temperature over a first temperature range as a function of the resistance of one of the elements, a second sensor configuration for sensing temperature over a second temperature range as a function of the surface resistance of the substrate between two of the elements, and a third sensor arrangement for sensing temperature over a third temperature range as a function of the bulk resistance of the substrate between two of the elements separated by a thickness of substrate material less than the surface distance therebetween. Four contact pads are provided to connect the three sensor configurations to external signal processing circuitry.

In a preferred form of the invention the substrate is a generally planar piece of glass-ceramic material. The first sensing arrangement comprises a first conductive element in the form of a thin conductive film deposited on the upper surface of the substrate in a serpentine pattern with contact pads for connection to external circuitry at each end thereof. Temperature is sensed over a relatively low temperature range as a function of the resistance of the conductive strip between the two pads. The second sensing arrangement comprises a second conductive element in the form of a strip of conductive film deposited on the upper surface uniformly laterally spaced from a peripheral portion of the first element with a contact pad for connecting this strip to external circuitry. Temperature is measured by this configuration over the relatively high portion of the operating range for the sensor as a function of the surface resistance of the substrate between the first and second conductive elements. The third sensor configuration comprises a third conductive element deposited on the lower surface of the substrate generally opposite and in a pattern generally similar to the first conductive element, with a contact pad for connection to external circuitry. Temperature information is derived from this configuration over the temperature range intermediate the low and high ranges as a function of the bulk resistance of the ceramic material between the first and third conductive elements.

In accordance with another aspect of the invention a plurality of conductive elements is deposited on or in a glass-ceramic substrate so as to provide two sensor configurations for measuring temperature over an operating range divided into a relatively higher portion and a relatively lower portion. The first sensor configuration comprises first and second laterally spaced elements deposited on the upper surface of the substrate for sensing temperature over the relatively high portion of the operating range as a function of the surface resistance of the substrate between the first and second conductive elements. The second sensor configuration comprises a third conductive element deposited on the lower surface of the substrate generally opposite and in a pattern which generally underlies one of the first and second elements, for sensing temperature as a function of the bulk resistance of the ceramic material between the third element and that one of the first or second elements which it underlies.

BRIEF DESCRIPTION OF THE DRAWINGS

FIG. 1 is a perspective view of a temperature sensor illustratively embodying the present invention enlarged to more clearly illustrate structural details;

FIGS. 2A and 2B are elevational top and bottom views respectively of the sensor of FIG. 1;

DETAILED DESCRIPTION

Figure 3:
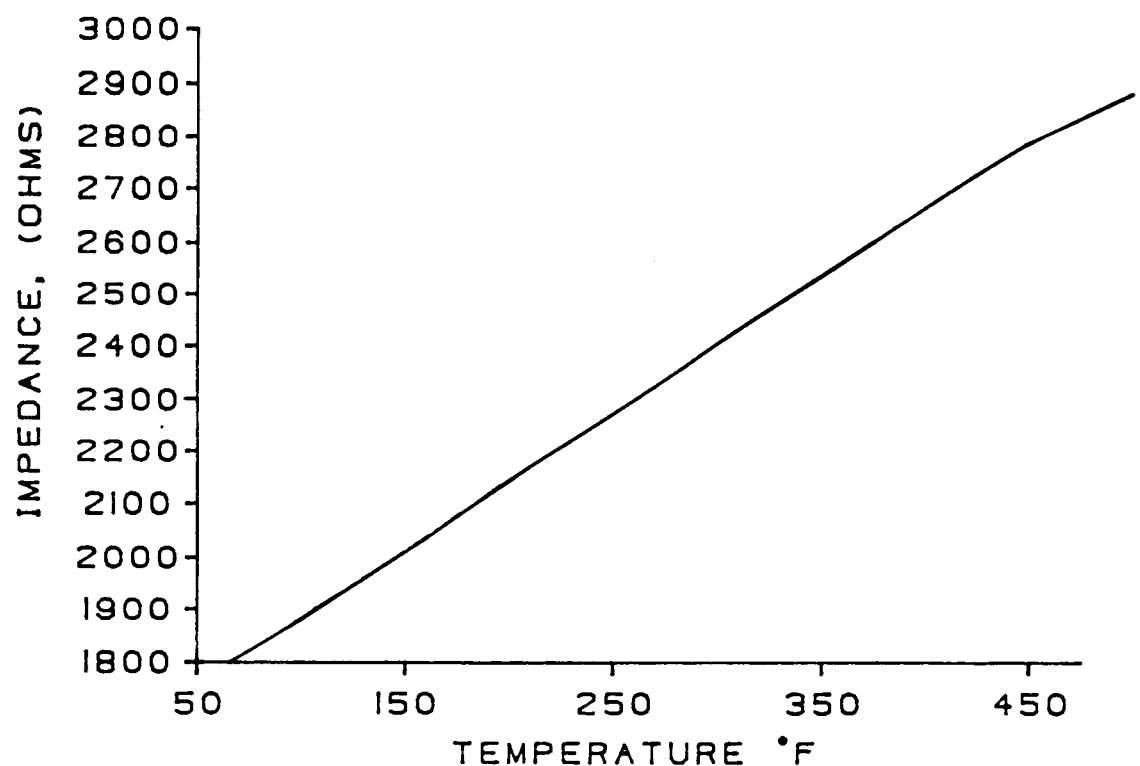
FIG. 3 is a graphical representation of the relationship of resistance and temperature for the low temperature sensor configuration for the sensor of FIG. 1.

Referring now to FIGS. 1, 2A and 2B, a temperature sensor illustratively embodying the present invention, designated generally 10, comprises a generally planar glass-ceramic substrate 12 having a first or upper surface 12(a) and a second or lower surface 12(b), and a plurality of conductive strips 14, 16 and 18. Strips 14 and 16 are deposited on surface 12(a) with strip 18 deposited on surface 12(b), generally opposite and laterally co-extensive with strip 14.

The term "glass-ceramic" as used herein refers primarily to a re-crystallized silicate material characterized by virtually zero thermal expansion and a high thermal coefficient of resistivity such as the Ceran family of materials manufactured by Schott Glaswerke and similar materials manufactured by Nippon Electric Glass Company and Corning Corporation, but is intended to also include any other silicate materials including so-called "doped glass" having comparable thermal coefficients of resistivity characteristics. Substrate 12 is formed of a lithium aluminum silicate material designated Ceran-85 manufactured by Schott Glaswerke. This particular material has been found to provide satisfactory performance as the substrate for a sensor over the temperature range of interest for domestic self-cleaning ovens. However, it should be appreciated that other conductive glass and glass-ceramic compositions may be similarly employed.

Conductive strip 14 is disposed over the upper surface 12(a) of substrate 12 in a serpentine pattern which terminates at contact points 14(a) and 14(b) formed at opposite ends thereof. Strip 14 is preferably approximately 0.05 inches wide, and 35 inches long with a nominal thickness of 10000Å. Each length of strip 14 is laterally separated by approximately 0.05 inches. Use of a serpentine pattern for strip 14 provides the necessary strip length in a limited surface area. Conductive strip 16 is of comparable width and thickness to strip 14, extending parallel to that portion of strip 14 which terminates in pad 14(b). Strip 16 is separated from this closest portion of strip 14 by approximately 0.3 inches. Conductive strip 18 is applied to the surface 12(b) opposite conductive strip 14 in an open pattern similar to the serpentine pattern of strip 14 with the addition of a central shorting strip 18(a) extending the width of the pattern perpendicular to the long legs of the pattern to better approximate the electrical conductivity of a solid square or rectangular pattern. The open pattern is preferred for strip 18 primarily because it requires less conductive material than a solid pattern over the same area. However, the particular configuration of strip 18 is not critical provided it substantially underlies, i.e. is laterally coextensive with strip 14. For example, it could be a solid pattern having a perimeter comparable to the peripheral dimensions of the serpentine pattern of strip 14. Strip 18 has a single contact point 18(b). Conductive runs 15(a) and 15(b), 17 and 19 electrically connect contact points 14(a), 14(b), 16(a) and 18(b) to terminal pads 14(a)', 14(b)', 16(a)' and 18(b),' respectively, located at the opposite end of substrate 12.

Electrical connection of the sensor strips 14, 16, and 18 to external control circuitry is complicated by the high temperature environment presented inside an oven cavity. Soldering is a preferred method of connection for ease of manufacturing and reliability. However soldered connections must be protected from the internal oven temperatures. Substrate 12 is elongated to facilitate a mounting arrangement in which the sensor may be mounted in a slot in the rear wall of the oven with the sensor strips 14, 16 and 18 located inside the oven and the terminal pads located outside the oven. When mounted in this way, the terminal pads are not exposed to the high temperatures inside the oven and may be connected to external control circuitry by conventional soldering techniques.

For the oven sensor of the illustrative embodiment substrate 12 measures approximately 2.7"×5.4"×0.125". It will be appreciated, however, that other dimensions and substrate configurations could be similarly employed.

Conductive strips 14, 16 and 18 may be deposited on substrate 12 by conventionally screen printing a metallo-organic paste commonly referred to as a resinate on the glass-ceramic surface in the desired pattern using for example a 200 mesh screen. In the illustrative embodiment a platinum paste designated A4649 available from Engelhard Corporation is used for the conductive strips; however, other metal combinations could also be used, provided the material used for strip 14 provides a suitable thermal coefficient of resistivity to allow strip 14 to function as a temperature sensor as hereinafter described. Conductive runs 15(a), 15(b), 17 and 19 may be similarly deposited on substrate 12. However in order to prevent these conductive runs from adversely affecting sensor performance, they should be fabricated of a very highly conductive material such as a palladium silver paste, designated A-2519 available from Engelhard Corporation.

In accordance with one form of the present invention particularly applicable to a self-cleaning oven temperature control system, conductive strips 14, 16 and 18 are cooperatively configured in combination with substrate 12 to provide a temperature sensor 10 which includes three sensor configurations. Each configuration is most effective relative to the others over a different portion of the operating temperature range. The external control circuitry can selectively use the temperature information from that one of the three configurations associated with the temperature range containing the temperature then being sensed.

The first sensor configuration comprises strip 14. In this configuration the resistance of strip 14 between pads 14(a)' and 14(b)' is measured to obtain temperature information. Glass substrate 12 merely serves as a support structure for conductive strip 14. The resistance versus temperature curve for strip 14 is shown in FIG. 3. This sensor works particularly well for temperatures in the 100°–450° F. temperature range. Though the resistance for this sensor increases approximately 2.6 ohms per °F., which is considerably lower than that of the glass-ceramic substrate, it provides absolute resistance values in the range of 1900-2800 ohms over the lower portion (100°–450°–F.) of the sensor operating range. By contrast the glass-ceramic substrate resistance is grater than $10^6$ ohms toward the lower end of this same range.

Figure 4:
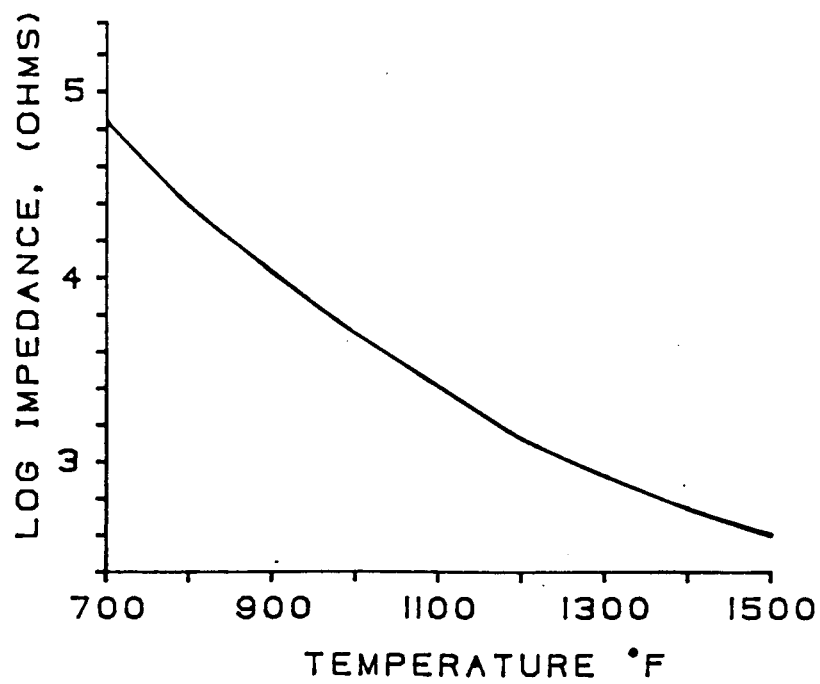
FIG. 4 is a graphical representation of the relationship of resistance and temperature for the high temperature sensor configuration for the sensor of FIG. 1.

A second sensor configuration uses strip 14 in combination with strip 16 and substrate 12 to provide temperature information as a function of the resistance of glass-ceramic substrate 12 between strips 14 and 16, which is essentially the surface resistance of the glass-ceramic material. The temperature vs resistance characteristics for this sensor configuration is illustrated in FIG. 4. As shown in FIG. 4, this configuration is best suited for use in the relatively high temperature range of 750°–1500° F. Over this range the resistance varies from a high of about 50,000 ohms down to about 300 ohms. At temperatures below about 750° F. the resistance varies from $10^5$ to the undesirably high value of $10^{12}$ ohms.

Figure 5:
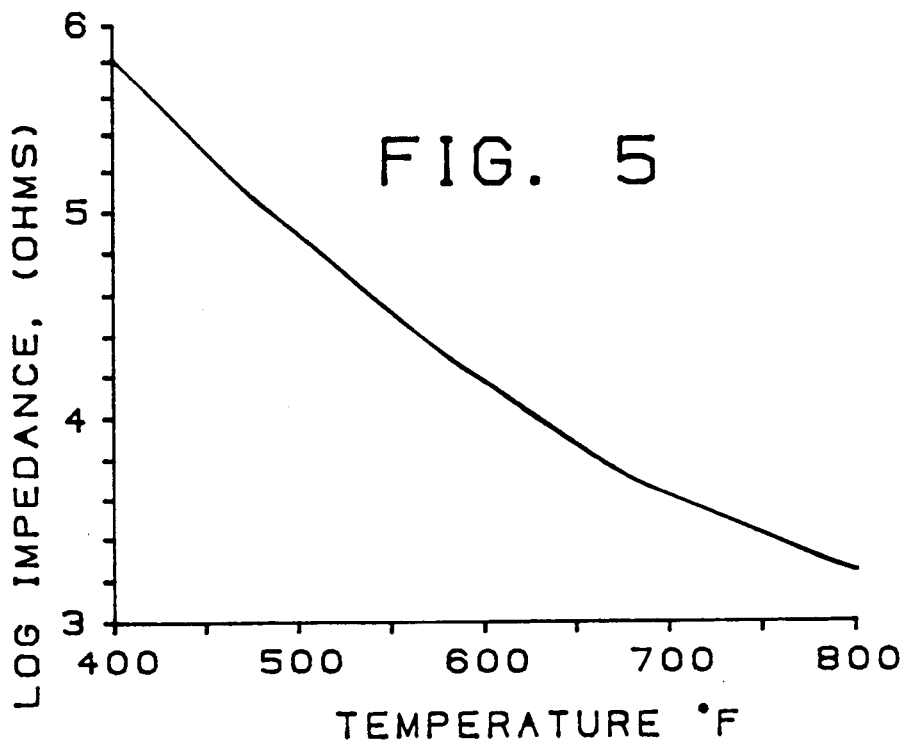
FIG. 5 is a graphical representation of the relationship of resistance and temperature for the intermediate temperature sensor configuration for the sensor of FIG. 1.

A third sensor configuration comprising the combination of strips 14 and 18 and glass-ceramic substrate 12 measures the temperature in the range generally between the aforementioned low and high temperature ranges (i.e. 450° F.–750° F.). This combination provides temperature information as a function of the bulk resistance of the substrate, i.e. the resistance presented by the thickness of the glass-ceramic material between strips 14 and 18. The resistance vs. temperature characteristic of the glass-ceramic substrate between strips 14 and 18 is illustrated in FIG. 5, which shows that the resistance of glass-ceramic substrate 12 between strips 14 and 18 varies from a high of about 200,000 ohms at 450° F. to a low of about 2000 ohms at about 750° F.

Thus, by this arrangement sensor 10 can be used to measure temperature over the range of 100° F. to 1500° F. with an effective sensor resistance confined to range of approximately 300 ohms to 200,000 ohms, a resistance range which can be used without the added cost of interface circuitry which would be required for the wider range of resistance values which would be required for sensors relying solely on a single ceramic sensor configuration.

By employing contact terminal pad 14(a)' as the common ground pad for all three sensor configurations, sensor 10 can be connected to the external control circuitry, using only four leads, one connected to each of pads 14(a)', 14(b)', 16(a)' and 18(b)'.

Figure 6:
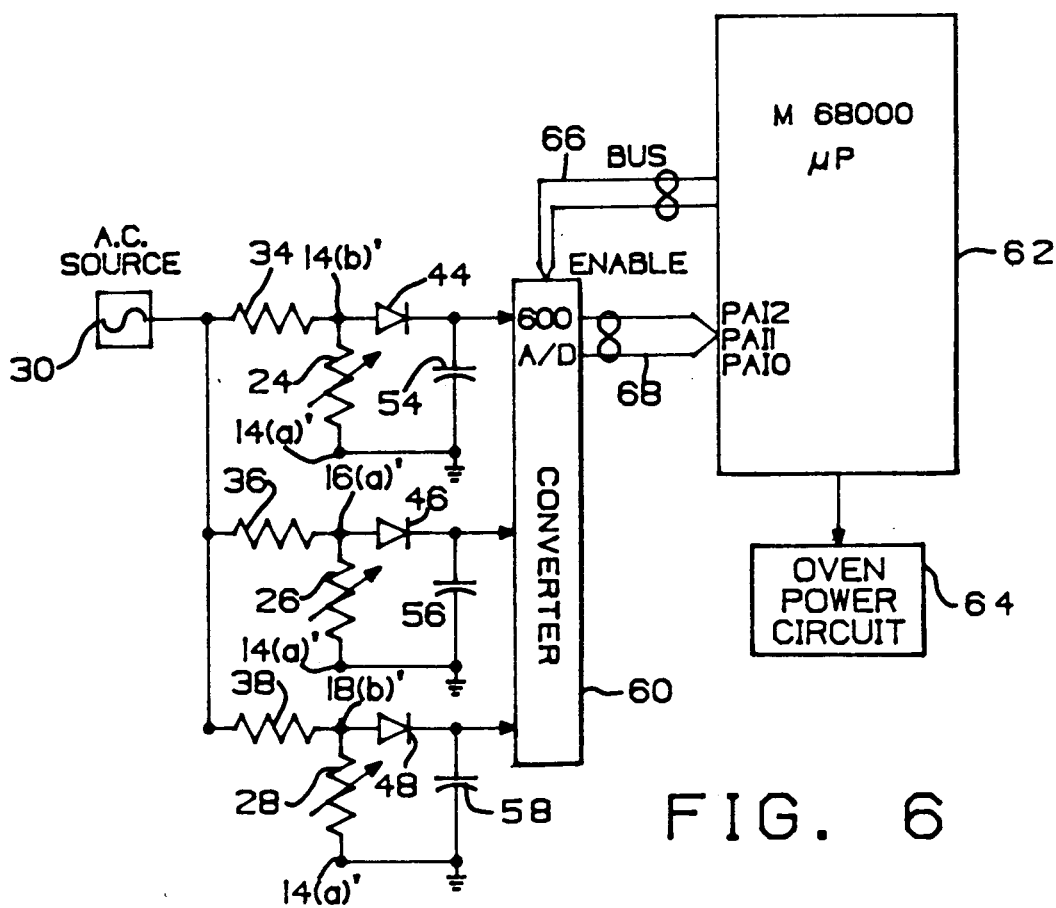
FIG. 6 is a simplified schematic circuit diagram for an oven control circuit incorporating the sensor of FIG. 1.

Illustrative external control circuitry for controlling the temperature in a domestic cooking oven incorporating sensor 10 is schematically illustrated in FIG. 6. Each of the three sensor configurations is represented in the circuit of FIG. 6, as a variable resistor. Resistor 24 represents the low temperature configuration comprising the resistance of strip 14 between pads 14(a)' and 14(b)'. Resistor 26 represents the high temperature configuration comprising the resistance between strips 14 and 16, as measured between pads 14(a)' and 16(a)'. Resistor 28 represents the intermediate temperature configuration comprising the resistance between strips 14 and 18 as measured between pads 14(a)' and 18(b)'.

An AC drive is necessary for the sensor configurations which use the resistance of the glass to prevent polarization of the glass which would eventually occur if the dc source were to be applied. The drive circuit for each of the sensor configurations comprises a 5 volt, 60 Hz, AC supply 30 which is coupled to resistances 24, 26 and 28 via 2K ohm 34, 36 and 38 respectively, at terminal pads 14(b)', 16(a)' and 18(b)' respectively. Diodes 44, 46 and 48 and 10 uf capacitors 54, 56 and 58 respectively rectify and smooth the AC signal appearing at terminal pads 14(b)', 16(a)' and 18(b)' for input to A/D converter 60. Converter 60 is a Motorola 600 A/D converter circuit.

Converter circuit 60 converts the analog voltage signals to digital signals for input to microprocessor 62, which generates power control signals for oven power circuit 64 as a function of the sensed temperature. Microprocessor 62 is a Motorola 68000 series microprocessor programmed to operate as a virtual memory machine, with its read only memory (ROM) permanently configured to implement a power control scheme for a range oven which uses temperature information from sensor 10, to control oven temperature.

Microprocessor 62 sequentially enables the input from each sensor configuration by enable signals coupled to converter 60 via bus 66. The converted output for the enabled sensor is then coupled by bus 68 to microprocessor 62 for storage at the corresponding one of the three memory locations PAI0, PAI1 and PAI2 for resistances 24, 26 and 28 respectively. By this arrangement the temperature sensed by each configuration is periodically stored in the microprocessor memory.

Figure 7:
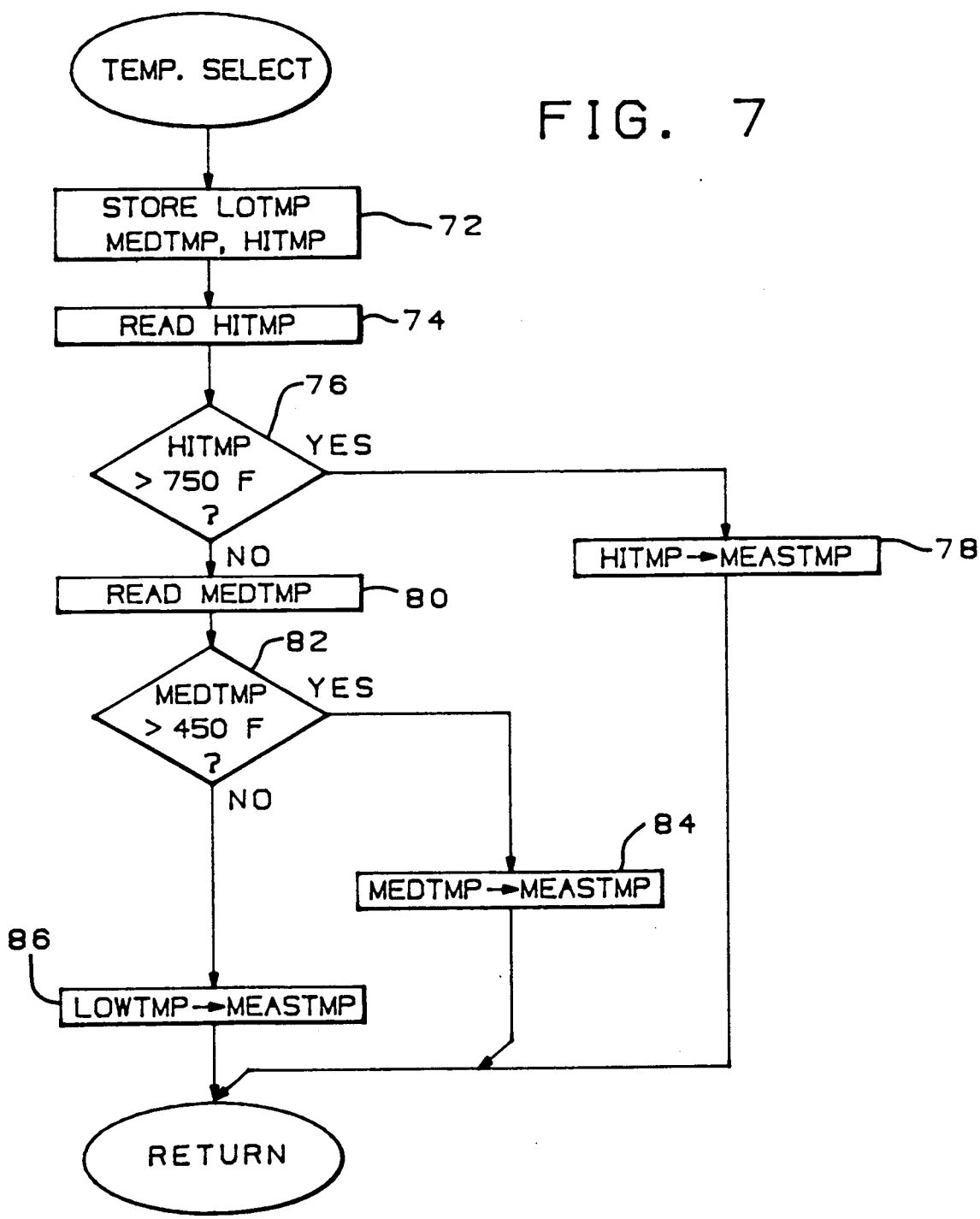
FIG. 7 is a flow diagram of the Temp Select routine incorporated in the control program for the microprocessor in the circuit of FIG. 6.

It will be recalled that microprocessor 62 is customized by permanently configuring the ROM to implement a predetermined set of instructions to control oven temperature as a function of temperature information from sensor 10. FIG. 7 illustrates a flow diagram for the Temp Select control routine which enables the microprocessor to read in and store the sensor input signals and select the particular one of the three stored values to be used for the next power control decision. From this diagram one of ordinary skill in the programming art could prepare a set of instructions for permanent storage in the ROM of microprocessor 62 which would enable the microprocessor to implement this routine. It will be appreciated that other sub-routines would be included to perform the actual power control functions for the oven as well as other control functions for the appliance.

The function of the Temp Select routine is to select the temperature input obtained from the appropriate one of the three sensor configurations according to the temperature then being sensed. This is accomplished by first looking at the input from the high temperature configuration. If this input represents a temperature greater than 750° F., it is used as the power control value. If not, the input from the intermediate range configuration is checked. If the temperature is greater than 450° F., this value is used as the control value. If less than 450°) F., the value from the low temperature configuration is used.

Referring now to FIG. 7, on entering this routine the program stores the signals sequentially received via bus 68 at memory locations PAI0, PAI1 and PAI2. The information stored at these locations is identified respectively as variables HITMP, MEDTMP and LOTMP (Block 72). The signal stored at PAI0 corresponding to the output from the high temperature sensor configuration designated HITMP is read first (Block 74). If the sensed temperature is greater than 750° F. (Yes at Inquiry 76) this value is stored as the variable MEASTMP (Block 78), the variable used to represent the sensed oven temperature in the power control routine (not shown). Returning to Inquiry 76, if the output from the high temperature sensor configuration is less than 750° F., the output stored at PAI1 representing the output from the intermediate temperature sensing configuration represented by the variable MEDTMP is read (Block 80) and compared to 450° F. (Inquiry 82). If greater, MEDTMP is stored as MEASTMP (Block 84); if less, the output from the low temperature sensor configuration stored at PAI2 is stored as the operative temperature variable MEASTMP (Block 86).

The above described sensor is particularly useful in applications such as self-cleaning domestic ranges in which the temperature range of interest is so broad as to require all three sensor configurations. However, sensors in accordance with the present invention are not limited to cooking ovens. Such sensors may find application with industrial ovens as well. In applications in which the temperature range of interest is broader than the range covered by a single sensor configuration, but not so broad as to require three sensors, sufficient accuracy may be achieved using a two sensor configuration which utilizes only the resistance of the substrate material. For example, industrial ovens might require precise control over the range of 500° F. to 1500° F. In such applications the operating range may be conveniently divided into two portions, a high temperature portion and a low temperature portion. The configuration of such a sensor could be as illustrated in FIGS. 1, 2A, and 2B with the exception that only a single terminal pad 14(a)' and lead 15(a) would be needed for strip 14. In addition strip 14 need not be serpentine in configuration but could be a square filled in completely with conductive film or could be essentially identical to the open pattern of conductive element 18.

The control system for the two sensor configuration could be substantially the same as that shown schematically in FIG. 6, except that circuit elements for the sensor configuration using the resistance of strip 14, namely, variable resistor 24, current limiting resistor 34, diode 44 and capacitor 54, would not be needed. The control routine of FIG. 7 could be simplified to separately store only the inputs from the high temperature sensor configuration and the low temperature configuration. The high temperature input could be compared to a reference representative of the dividing temperature that is, the temperature at the boundary between the high and low temperature portions of the operating temperature range. If the high temperature input is higher than the reference it is used as the operative input temperature for power control purposes. If not, the low temperature input is used as the operative input temperature.

While in accordance with the Patent Statutes specific embodiments of the present invention have been illustrated and described herein, it is realized that numerous modifications and changes will occur to those skilled in the art. For example, the embodiments herein described are primarily intended for use as temperature sensors in self-cleaning domestic ranges. However, it will be appreciated that such sensors could be adapted for use in a variety of other applications such as industrial ovens with materials, dimensions and conductive strip configurations selected to optimize performance and cost for particular applications. It is therefore to be understood that the appended claims are intended to cover all such modifications and changes as fall within the true spirit and scope of the invention.

What is claimed is:

1. A temperature sensor comprising:
   a generally planar glass-ceramic substrate;
   first sensing means for sensing temperature over a first temperature range comprising a first conductive element deposited on one surface of said substrate;
   second sensing means for sensing temperature over a second temperature range comprising said first element and a second conductive element deposited on said one surface of said substrate adjacent and laterally spaced from a portion of said first element; and
   third sensing means for sensing temperature over a third temperature range comprising said first element and a third conductive element deposited on the opposite surface of said substrate generally laterally coextensive with said first element.

2. A temperature sensor in accordance with claim 1 wherein said first conductive element comprises a conductive film deposited on said one side of said substrate in a generally serpentine pattern and including a contact pad formed at each end thereof for connection to external circuitry and wherein said first sensing means is adapted to provide temperature information as a function of the electrical resistance of said first element between said contact pads.

3. A temperature sensor in accordance with claim 2 wherein said second conductive element comprises a conductive film including a conductive pad formed at one end thereof for connection to external circuitry and wherein said second sensing means is adapted to provide temperature information as a function of the electrical resistance of said glass substrate proximate said first surface thereof between said first and second elements.

4. A temperature sensor in accordance with claim 3 wherein said third conductive element comprises a conductive film including a contact pad for connection to external circuitry and said third sensing means is adapted to provide temperature information as a function of the electrical resistance of said glass substrate between said first and third elements.

5. A temperature sensor in accordance with claim 4 wherein said first temperature range is a relatively low range, said second temperature range is a relatively high range, and said third temperature range is between said first and second ranges.

6. A temperature sensor comprising:

a generally planar glass-ceramic substrate;

a first conductive element deposited on one surface of said substrate for sensing temperature over a first temperature range as a function of the electrical resistance of said first conductive element;

a second conductive element deposited on said one surface of said substrate adjacent, laterally spaced from a portion of said first element and operative in combination with said first element and said substrate for sensing temperature over a second temperature range as a function of the electrical resistance of said substrate between said first and second elements; and a third conductive element deposited on the opposite surface of said substrate generally underlying said first element and operative in combination with said first element and said substrate for sensing temperature over a third temperature range as a function of the electrical resistance of said substrate between said first and third elements.

7. A temperature sensor in accordance with claim 6 wherein said first temperature range is a relatively low range, said second temperature range is a relatively high range and said third temperature range is intermediate said first and second ranges.

8. A temperature sensor in accordance with claim 6 wherein said second and third elements each include a single contact pad and said first element includes a pair of contact pads, one at each end thereof, one of said pair comprising a common pad utilized over all three of said temperature ranges.

9. A temperature sensor comprising:

a glass-ceramic substrate and a plurality of conductive elements deposited on said substrate, said conductive elements being arranged to provide a first sensing means for sensing temperature over a first temperature range as a function of the electrical resistance of one of said elements, a second sensing means for sensing temperature over a second temperature range as a function of the surface electrical resistance of said substrate between two of said elements and a third sensing means for sensing temperature over a third temperature range as a function of the bulk electrical resistance of said substrate between two of said elements separated from each other by a thickness of said substrate less than the surface distance therebetween.

10. A temperature sensor in accordance with claim 9 wherein said one element of said first sensing means comprises one of said two elements in said second sensing means and one of said two elements of said third sensing means.

11. A temperature sensor comprising:

a glass-ceramic substrate and a plurality of conductive elements deposited on said substrate, said conductive elements being arranged to provide a first sensing means for sensing temperature over a first relatively high temperature range as a function of the surface electrical resistance of said substrate between two of said elements and a second sensing means for sensing temperature over a second temperature range as a function of the bulk electrical resistance of said substrate between two of said elements separated from each other by a thickness of said substrate less than the surface distance therebetween.

12. A temperature sensor for sensing temperature over an operating temperature range divided into an upper portion and a lower portion, said sensor comprising:

a generally planar glass-ceramic substrate;

first sensing means for sensing temperature over the upper portion of the operating temperature range comprising first and second conductive elements deposited on one surface of said substrate adjacent and laterally spaced from each other; and second sensing means for sensing temperature over the lower portion of the operating temperature range comprising one of said first and second elements and a third conductive element deposited on the opposite surface of said substrate generally laterally coextensive with said one of said first and second elements.

13. A temperature sensor in accordance with claim 12 wherein said first and second conductive elements each comprise a conductive film including a conductive pad formed at one end thereof for connection to external circuitry and wherein said first sensing means is adapted to provide temperature information as a function of the electrical resistance of said glass substrate proximate said first surface thereof between said first and second elements.

14. A temperature sensor in accordance with claim 13 wherein said third conductive element comprises a conductive film including a contact pad for connection to external circuitry and said second sensing means is adapted to provide temperature information as a function of the bulk electrical resistance presented by the thickness of said glass-ceramic substrate between said third element and said one of said first and second elements.

15. A temperature sensor comprising:

a generally planar glass-ceramic substrate;

first and second conductive elements deposited on one surface of said substrate adjacent and laterally spaced from each other and operative in combination with said substrate for sensing temperature over a first temperature range as a function of the surface electrical resistance of said substrate between said first and second elements; and a third conductive element deposited on the opposite surface of said substrate generally underlying one of said first and second elements and operative in combination with said one of said first and second elements and said substrate for sensing temperature over a second temperature range as a function of the bulk resistance of the thickness of said substrate between said third element and said one of said first and second elements.

* * * * *